United States Patent
Müller et al.

(10) Patent No.: US 6,779,326 B2
(45) Date of Patent: Aug. 24, 2004

(54) SPRING SYSTEM FOR FEEDER ROLLERS IN FORAGE HARVESTERS

(75) Inventors: Ralf Müller, Dohma (DE); Dirk J. Desnijder, Wondelgem (BE); Bernard E. D. Depestel, Oedelem (BE); Pierre E. Teetaert, Aartrijke (BE)

(73) Assignee: New Holland North America, Inc., New Holland, PA (US)

( * ) Notice: Subject to any disclaimer, the term of this patent is extended or adjusted under 35 U.S.C. 154(b) by 5 days.

(21) Appl. No.: 10/382,281

(22) Filed: Mar. 4, 2003

(65) Prior Publication Data

US 2003/0188521 A1 Oct. 9, 2003

(30) Foreign Application Priority Data

Mar. 9, 2002 (DE) .......................................... 102 10 437

(51) Int. Cl.[7] .............................................. A01D 61/00
(52) U.S. Cl. ................................................... 56/16.4 B
(58) Field of Search ........................ 56/16.4 R, 16.4 A, 56/16.4 B (56) References Cited

U.S. PATENT DOCUMENTS

| | | | | |
|---|---|---|---|---|
| 1,567,434 A | * | 12/1925 | Flatley | ..................... 56/16.4 R |
| 3,899,964 A | * | 8/1975 | Molitorisz | ..................... 100/89 |
| 4,040,344 A | * | 8/1977 | Moore et al. | .................. 100/95 |
| 5,822,962 A | * | 10/1998 | Wagstaff et al. | .......... 56/16.4 R |
| 6,510,679 B2 | * | 1/2003 | Krone et al. | .................... 56/62 |

FOREIGN PATENT DOCUMENTS

| | | |
|---|---|---|
| DE | OS 26 09 272 | 9/1977 |
| DE | 0797 914 | 10/1997 |
| DE | 1 151 658 | 11/2001 |

* cited by examiner

Primary Examiner—Thomas B. Will
Assistant Examiner—Alicia Torres
(74) Attorney, Agent, or Firm—John William Stader; Collin A. Webb (57) ABSTRACT

The apparatus is a spring system on forage harvester feedrolls. The upper forward feedroll has two concentric springs on each side. The outer spring is operative over the whole range of displacement. The inner spring exerts tensioning force on the feedroll only as of a certain minimal lifting of the feedroll. The rear upper feedroll has one spring on each side. This one spring has a substantially smaller spring force than the forward spring package. The feedroll supporting linkages are arranged with complementary and cooperating cam surfaces which are disposed so that, when the forward feedroll is lifted above a predetermined minimum value, the rearward feedroll is also lifted thereby (to a lesser degree) without even any lifting force from the crop material passing therebelow.

7 Claims, 8 Drawing Sheets

SPRING SYSTEM FOR FEEDER ROLLERS IN FORAGE HARVESTERS

FIELD OF THE INVENTION

The invention concerns a spring system for the upper feeder rollers in forage harvesters; in particular in a feeder device for a self-propelled forage harvester.

BACKGROUND OF THE INVENTION

Spring systems are encountered in feeder systems for forage harvesters, which in the predominant number today are equipped with two lower feeder rollers carried in bearing point fixed in the feeder casing and two upper feeder rollers working together with these. The upper feeder rollers designated in the following as prepressing rollers, are carried in bearing points in the feeder casing so that their height can be altered, in order to be able to move upwards on the drawing in of harvested crop. In doing so the spring system has the task of applying a defined roll force to the prepressing rollers and to the pressing rollers, so that in conjunction with the lower feeder rollers they can on the one hand compress the crop on being drawn in and on the other hand with the aid of this roll force make possible at all the drawing-in of the crop and its transport to the cylinder chopper.

Because of the increase in performance of forage harvesters required in recent years, ever higher demands are made upon their feeder equipment, which has led on the one hand to ever wider feeder devices and higher lift heights of the prepressing roller and of the pressing roller and to a further increase in the feeding speed of the crop. These higher demands can then be fulfilled only if through the spring system the roll forces exerted by the prepressing roller and the pressing roller on the crop are at least so great that the crop cannot be pulled in from the chopper cylinder. But on the other hand they must not be so great that not just any greater accumulation of crop leads to blockages in the feeder device. The roll forces must increase significantly with growing layer thickness of the crop as a result of friction of the crop on the sidewalls of the feeder device. In the region of smaller layer thickness on the other hand, they must be kept small so that particularly in the case of the maize harvest the grains are not knocked out of the cob by too high roll forces which in the case of large chopped lengths has a particularly negative effect. Finally it is still to be pointed out that the roll forces are applied not only by the spring system, but also by the forces of reaction from the driving moment of the prepressing rollers and the pressing rollers, upon which the roller weights and frictional forces are dependent when raising and lowering them. The greater proportion comes, however, from the spring system, followed by the forces of reaction. The remaining quantities are practically negligible.

For the fulfilment of these requirements already multitudes of spring systems have become known. One of them is to be seen in the Prospectus of the German firm CLAAS for the forage harvester series "Jaguar 880 to 820" with the note "11/20 (Rihn) German 70/CVG 1106.1". Here on the shafts of the prepressing roller and of the pressing roller, on the right side viewed in the direction of travel of the forage harvester, a gearbox is placed, which is equipped at the front with a console, on which two tension springs placed inside each other engage. Their point of suspension lies plainly in front of the shaft of the prepressing roller. A single further tension spring engages from below on the gearbox about in the centre between the prepressing roller and the pressing roller. On the other hand the arrangement of the tension springs is similar, only for reasons of space they are located somewhat further up, and instead of engaging with the gearbox the tension springs engage with the oscillating crank between the prepressing roller and the pressing roller. For damping unwanted oscillations two shock absorbers are fixed on both sides of the spring system.

A disadvantage with this system is that the differences in the roll forces for a thin and a thick layer of crop are not great enough, so that either with a roll force which is set too small the crop is conveyed ever worse with increasing thickness of the layer, or in the converse case the grains are knocked out of the cobs already before the chopper cylinder. Through the described position of the attachment points of the tension springs, on the one hand it is to be criticised that with every movement of the prepressing roller the magnitude of the roll force of the pressing roller changes and the converse, because of which both roll forces are undefined. On the other hand this attachment leads to an oscillating motion of the prepressing roller and the pressing roller about the point of attachment of the tension springs, so that the aforementioned shock absorber would be necessary, which represents a cost-increasing factor. Finally with these spring systems there is yet another disadvantage, that the tension springs and the lower stops of the prepressing roller and the pressing roller lie in a zone very much endangered by dirt, so that the tension springs can no longer return to their initial lengths and on the lower stops an interfering quantity of crop collects. The consequence of this is a restricted output of the crop with a small layer thickness.

A second variant embodiment for a spring system on a feeder device for forage harvesters was made known with EP 0 797 914 B1 and as an amplification of this in the prospectus belonging to this forage harvester with the note "62027/D00—Printed in Italy—12/96", in which likewise as with CLAAS on the shafts of the prepressing roller and the pressing roller a gearbox is put on. Almost centrally on the gearbox or on the oscillating crank between the prepressing roller and the pressing roller on the left side there is a pivot point, to which is attached an upwards projecting connecting rod, the upper end of which is likewise joined articulated with a swivelling lever, the other end of which ends in a bearing point attached to the casing of the feeder device. In a forwards projecting connecting bracket on the connecting rod a tension spring is suspended by its upper end and is fixed with its lower end to the front on the easing of the feeder device. As this spring system exhibits the same disadvantages as afore-described one, to avoid repetition reference will be made at this point only to this one.

A third possibility for the design of a spring system for the upper feeder rollers is expounded in EP 1 151 658 A1. The only difference from the two previously described ones consists in that instead of two upper feeder rollers three are employed here. As the coupling of the two tension springs on each side is in principle executed the same as for the two previously described spring systems; the same disadvantages apply here too.

In the prospectus of the German firm MENGELE with the note "WA FITZEK/1/94—10" a self-propelled forage harvester of the type "MAMMUT" with a feeder device and spring system for the upper feeder rollers is depicted. Here the roll force acting on the prepressing roller is produced by two tension springs, and that for the pressing roller is produced by a tension spring one on each side. Although here the directions of pull of the tension springs in the lowest position of the prepressing roller and of the pressing roller appear at first glance to be somewhat more favourable than in the three previously described spring systems, it is nevertheless to be criticised, that with the differently large excursions the position of the tension is so far removed from the shafts of the rollers, that every movement of the prepressing roller changes the magnitude of the roll force of the pressing roller and vice versa. In the same way the disadvantage remains of the too small difference in the roll forces for a thin and a thick layer of crop. Also the soiling of the tension springs and of the lower stops is unavoidable here, so that also the disadvantages associated with this exist.

Finally, reference would be made to the feeder device with upper feeder rollers and a spring system in accordance with DE-OS 26 09 272, in which the prepressing roller and the pressing roller are carried in bearing points in an approximately vertical orientation in the side walls so that they can be moved independently of each other. Each of the upper feeder rollers obtains its drive separately via a cardan shaft. The roll force is produced here by compression springs, which are abut with their upper ends on the casing of the feeder casing and which press with their lower ends on the bearing of the prepressing roller or the pressing roller. For adjusting the roll force the upper ends are held in threaded couplings, which are vertically adjustable by means of threaded spindles. Although through the separate drives the reaction forces resulting from them are practically excluded, this solution too has still some disadvantages attached to it. These are that also here there are too small differences in the roll forces with differing thicknesses of the layer of harvested crop and the position of the lower stops for the prepressing roller and the pressing roller in the area of greatest soiling with dirt. Furthermore, with the increasing of the roll force the upper stop is displaced downwards, so that the maximum height of lift thereby experiences a restriction. Besides, through the possibility of movements of both rollers completely independently of each other blockages can occur in the event that the prepressing roller is raised up to the upper stop and the pressing roller remains below. Therefore the task of the invention is to create a spring system for the upper feeder roller of a forage harvester, in which the roll forces increase distinctly with growing thickness of the layer of the harvested crop, where the springs envisaged for the prepressing roller load only this roller over the whole lifting path and not the pressing roller and vice versa, the springs of which are situated in a space less burdened with dirt and in which the upper and the lower stops of the rollers are so formed and arranged, that the prepressing roller and the pressing roller actually come again always into this same position regardless of deposits of dirt.

SUMMARY OF THE INVENTION

For the present feeder device with two upper feeder rollers the front prepressing roller and the pressing roller arranged behind it are attached opposite two lower feeder rollers carried in bearing points at a fixed location in the casing of the feeder device so that their distance can be varied, as a result of which they can swing between their lowest and uppermost position according to the supply of crop. So that on the one hand they can pre-compress the crop well in combination with the lower feeder roller and on the other hand be able to transport it to the chopping device, they have the necessary roll force applied to them by means of the compression springs with their upper ends abutting with the casing of the feeder device and with their lower ends supported on the bearing point points of the upper feeder rollers. The compression springs are held in position with guide rods, onto which they are placed concentrically and their upper ends are attached to the casing of the feeder device so that they can move freely.

For the prepressing roller two compression springs are employed, one of which exerts a small roll force on it already in the lowest position of the prepressing roller. The second compression spring remains without effect over the first stretch of its lifting path from the lowest position and engages only later with its upper end on the casing of the feeder device, as a result of which then its roll forces add up to a very great roll force. Through this high roll force it is possible without any problems, to exclude the forces of reaction arising from the drive moments of the upper roller on the prepressing roller, which with an appropriate management of the drive relieve the prepressing roller, without negative influences on the precompresssion and transport at the this point. The roll force for the prepressing roller is produced by a compression spring, which already in its lowest position is under a slight prestress and which over the entire lifting path of the pressing roller exerts a distinctly lower roll force on it than do the two compression springs on the prepressing roller. Consequently, with the same drive management as described above the forces of reaction arising from the driving moments for the upper roller bear down on the pressing roller from above and press it onto the crop, so that it is even possible to dispense with these compression springs altogether.

As a precaution, all the spring systems for the prepressing roller lie within the wishes of protection of the invention, which exhibit a progressively rising spring characteristic and differ in detail from the previously described solution. Also specially formed single compression springs or systems with more than two springs fall under this protection.

In this spring system, the area of small layer thicknesses exerts only small roll forces on the crop and with growing layer thickness the roll forces increase distinctly. The direction of the roll forces on the bearing points as close and possible to the central axes of the shafts of the prepressing roller and of the pressing roller lead to their defined loading without mutual influencing of each other. Through the position of the compression springs and the upper and lower stops for limiting the freedom of movement of the upper feeder rollers in their uppermost and lowest position in a largely dirt free space their unchanged position over a long time is ensured.

BRIEF DESCRIPTION OF THE DRAWINGS

The advantages of this invention will be apparent upon consideration of the following detailed disclosure of the invention, especially when taken in conjunction with the accompanying drawings wherein.

DETAILED DESCRIPTION OF THE INVENTION

Referring to the drawings, it is possible to observe the major elements and general operation of the present invention. Left and right references are used as a matter of convenience and are determined by standing at the rear of the forage harvester and facing the forward end in the normal direction of travel. Likewise, forward and rearward are determined by normal direction of travel of the tractor or round baler. Upward or downward orientations are relative to the ground or operating surface. Horizontal or vertical planes are also relative to ground.

Figure 1:
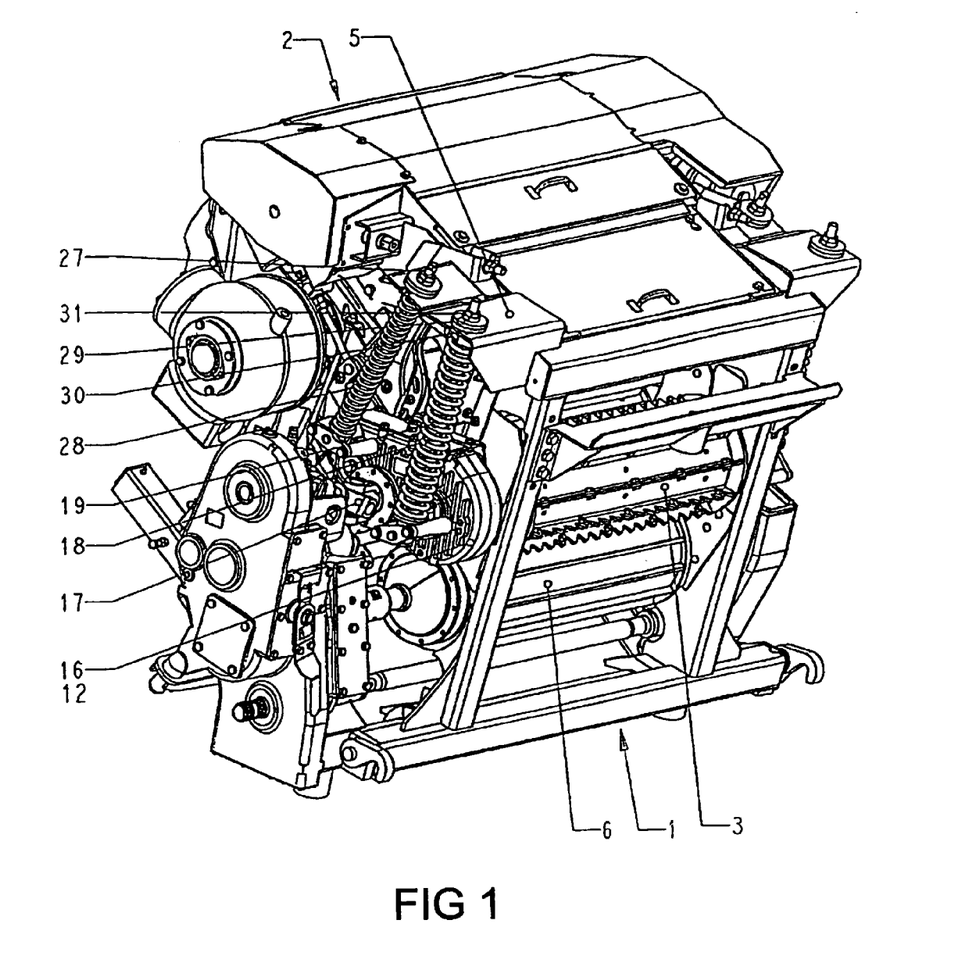
FIG. 1 shows a perspective view from the front right of the feeder device with attached chopping device.
Figure 2:
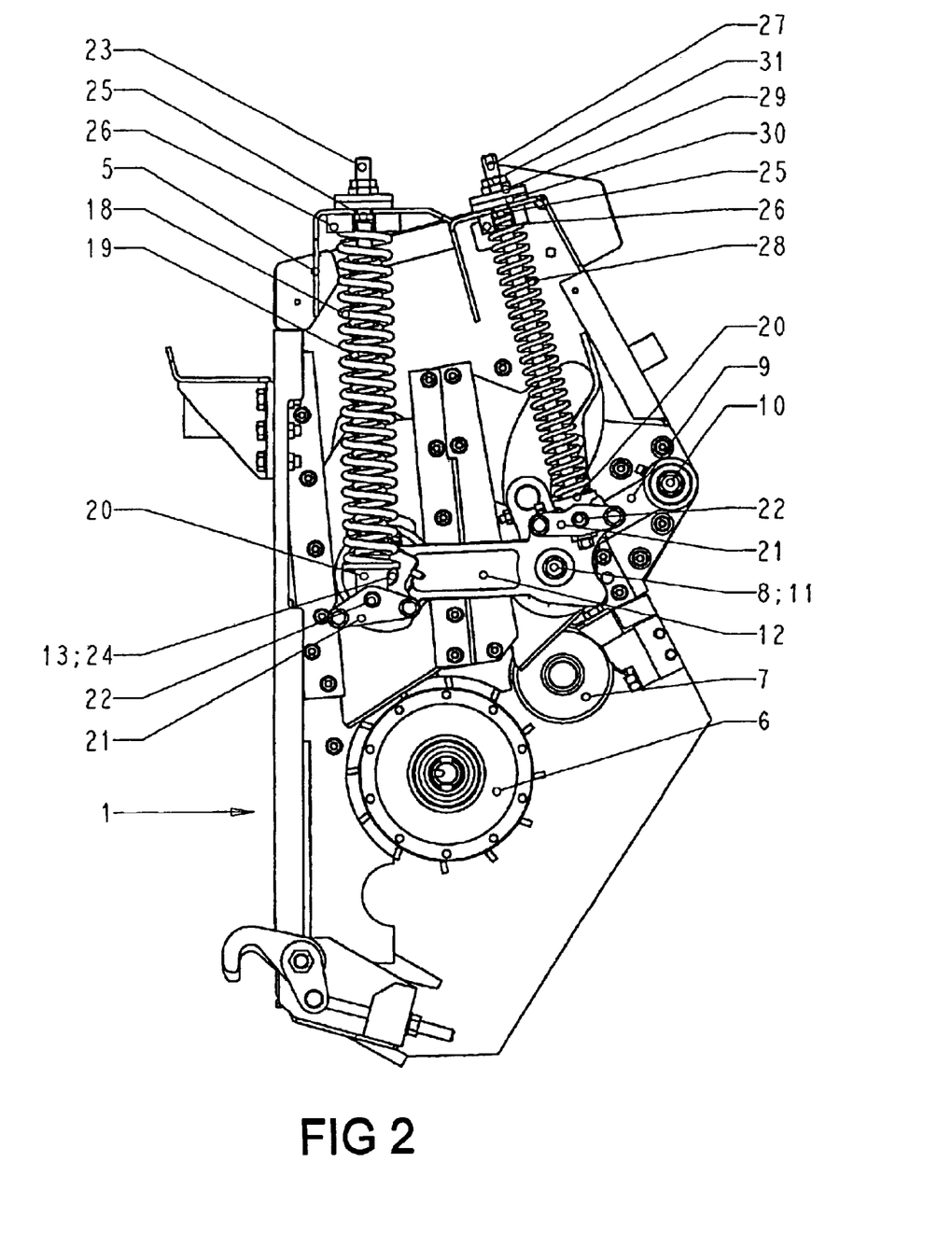
FIG. 2 shows a side view of the left side of the feeder device.
Figure 3:
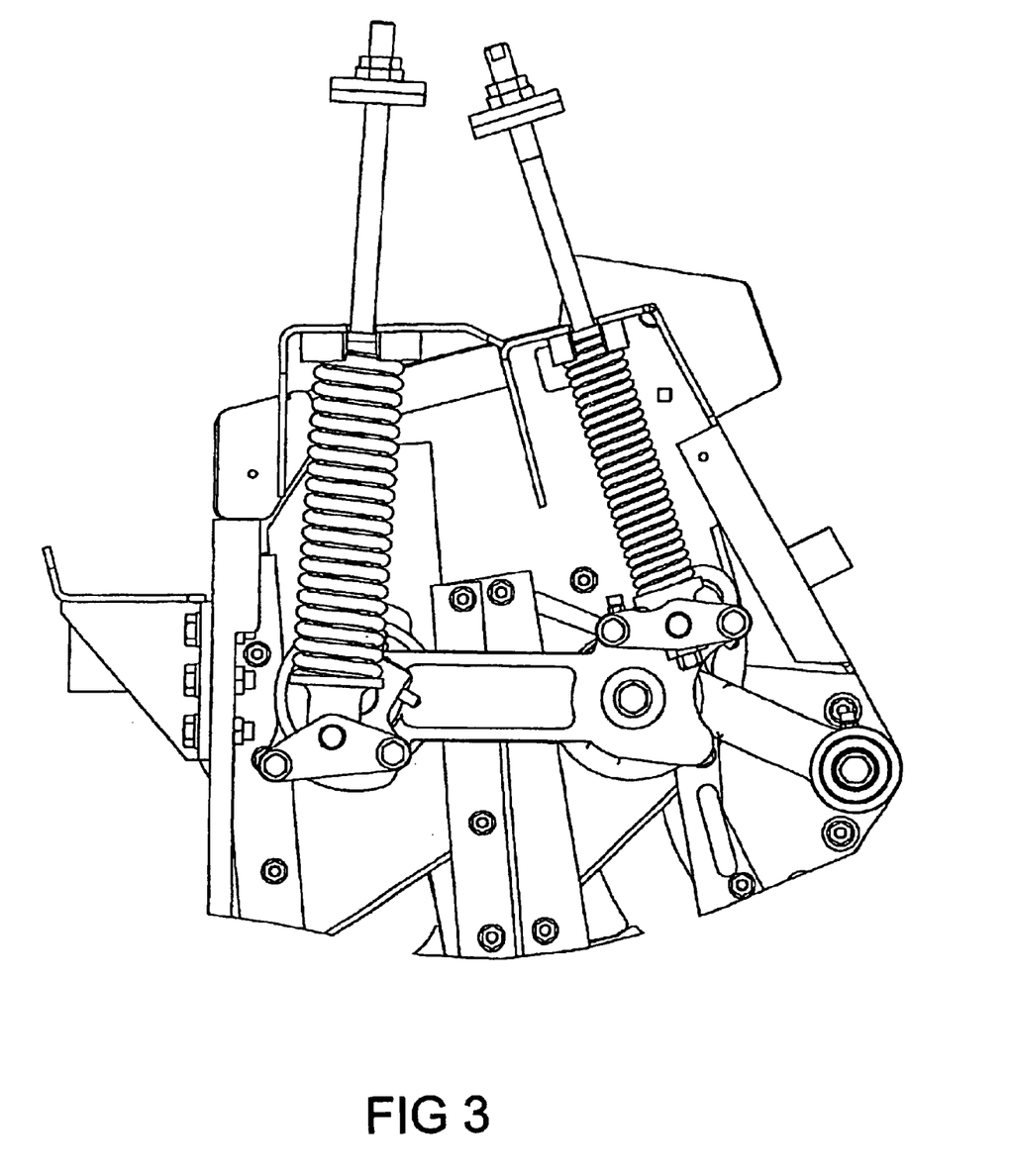
FIG. 3 shows the prepressing roller is in the uppermost position and the pressing roller is forcibly raised up by the connecting rod and oscillating crank.
Figure 4:
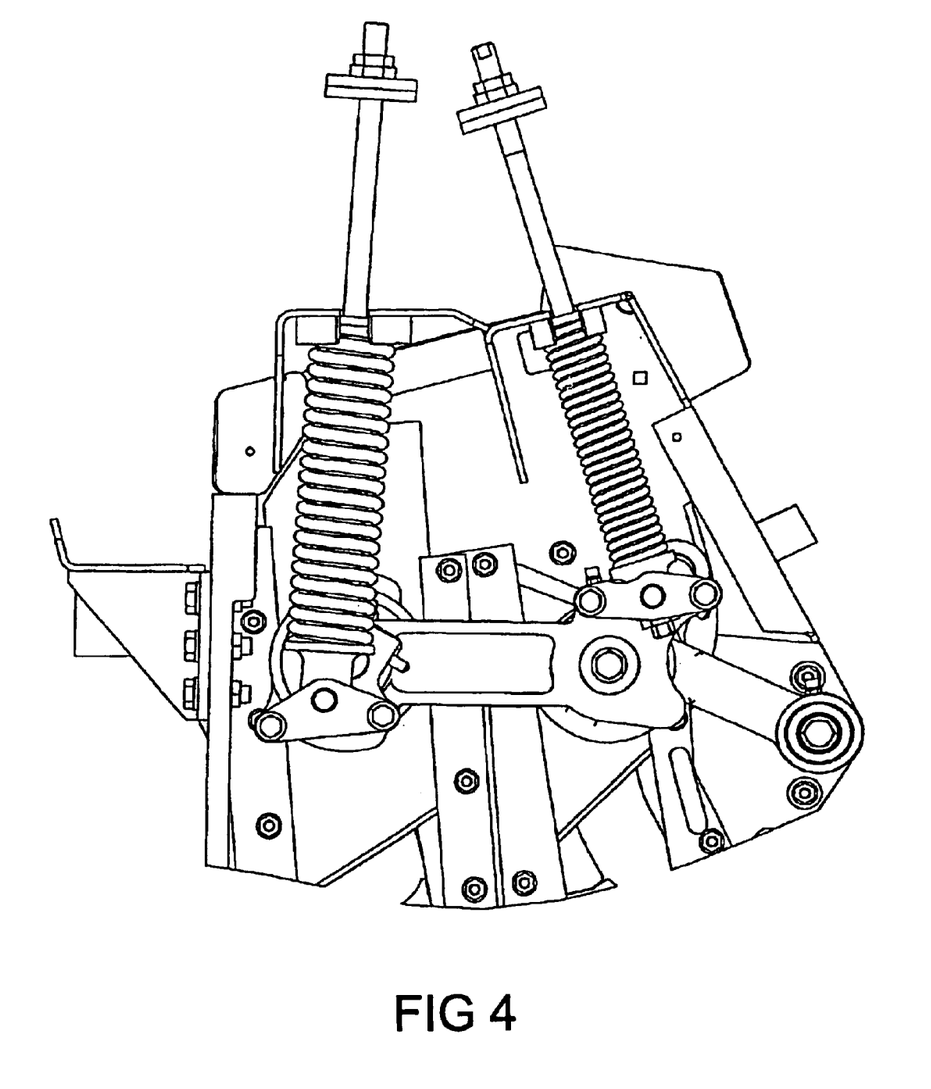
FIG. 4 shows the prepressing roller and the pressing rollers are in the uppermost position raised up by the crop.
Figure 7:
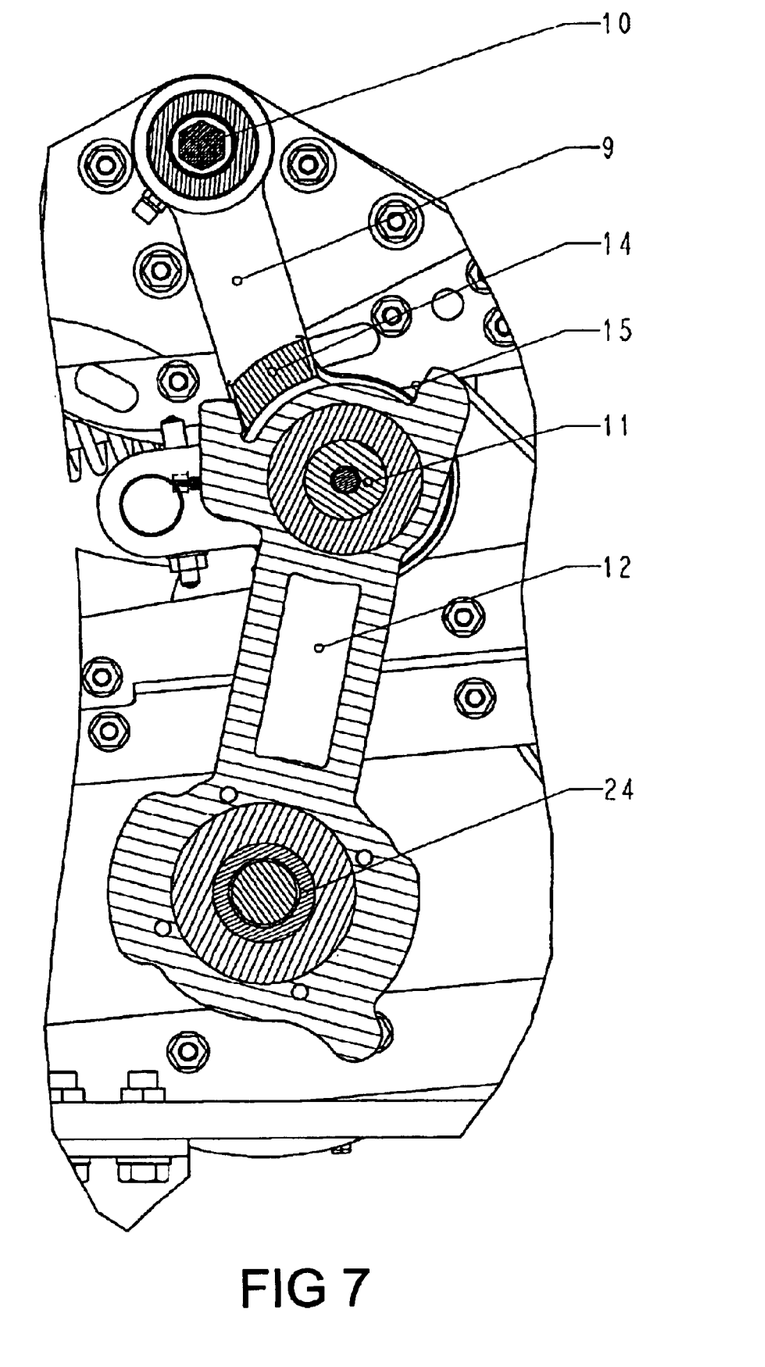
FIG. 7 shows a sectional view perpendicular to the central axis of the shaft of the pressing roller through the oscillating crank and the connecting rod.
Figure 8:
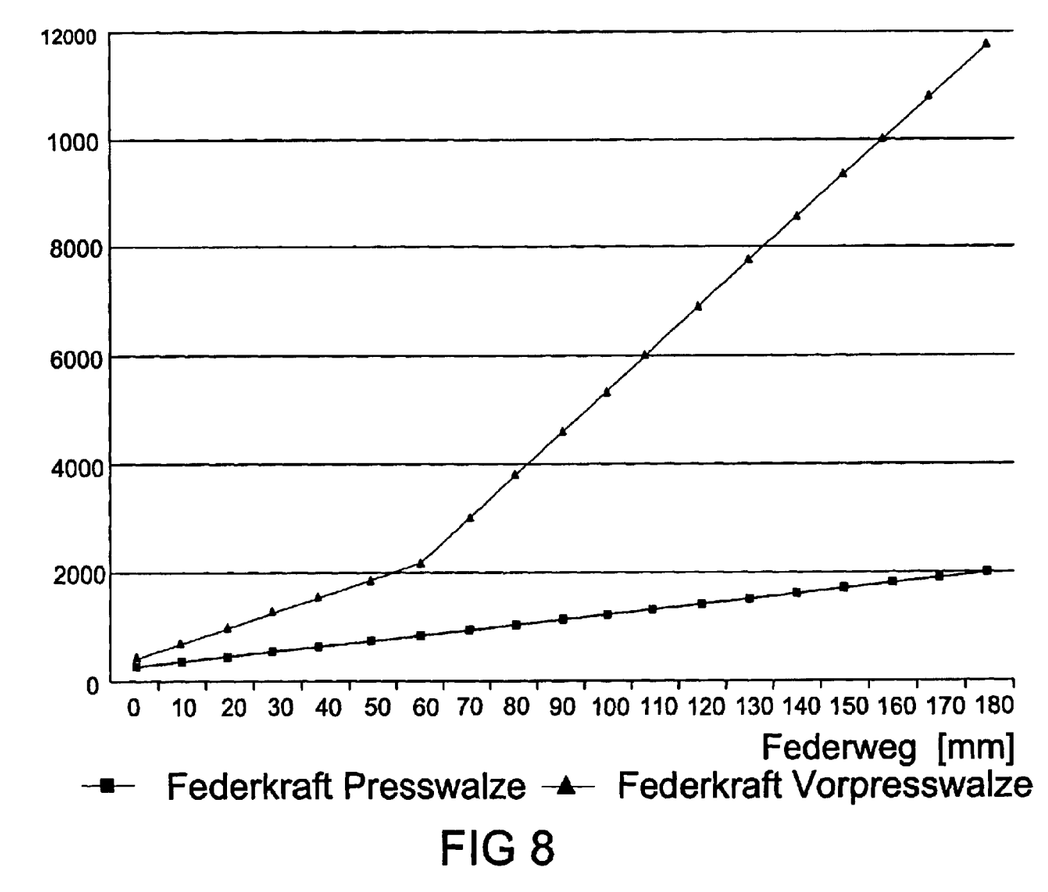
FIG. 8 shows two spring characteristics for the compression springs of the prepressing roller and the compression spring of the pressing roller.

In FIG. 1 is shown the feeder device (1) of a forage harvester with a chopping device (2) arranged on it in a perspective view from the front and the right, on which the spring system in accordance with the invention is implemented. FIG. 2 conveys a direct side view of its left side without the chopping device (2). The feeder device (1) has two upper feeder rollers, which according to the direction of flow of the crop are designated as the prepressing roller (3) and pressing roller (4). These are arranged opposite the front lower feeder roller (6), which is in bearing points at a fixed position in the casing (5) of the feeder device (1), and the rear lower feeder roller (7) in such a way that their distance from these can be varied. For this the pressing roller (4) with its bearing points (8) is held in the front ends of oscillating cranks (9), which with their rear ends carried in bearings on pivot bolts (10) fixed in the casing (5) of the feeder device (1) so that they can pivot. On both sides on the shaft (11) of the pressing roller (4) a connecting rod (12) engages with its rear end in bearings, in the front ends of which there are bearing points (13) located for the prepressing roller (3). A short formed part (14) attached to the oscillating crank (9) engages with a longer recess (15) incorporated into the connecting rod (12), which is depicted in the sectional view of FIG. 7 as a detail. FIG. 3 shows, how the prepressing roller (3) is raised up maximally by the crop and how through the location of the formed part (14) on one side of the recess (15) the pressing roller (4) is raised a bit without the influence of the crop. On the right side viewed in the direction of travel the connecting rod (12) is formed as a spur gear box (16), the central spur wheel of which is connected with a cardan shaft (17) so that it can be driven.

The spring system for the upper feeder rollers is so constructed that on the bearing points (13) of the prepressing roller (3) a compression spring (18) formed as an external spring engages, into which a second compression spring (19) formed as an internal spring projects. Both compression springs (18; 19) have an opposite direction of coiling and abut with their lower ends on a spring base (20), which is arranged so that it can swivel about a bolt (22) attached to the connecting rod (12) by means of a holding bracket (21). To the spring base (20) a guide rod (23) pointing essentially in a vertical direction is rigidly joined, on which the compression springs (18; 19) are located in a concentric arrangement. At the same time the longitudinal axis of the guide rod (23) lies very close to the central axis of the shaft (24) of the prepressing roller (3) or runs directly through it.

Figure 5:
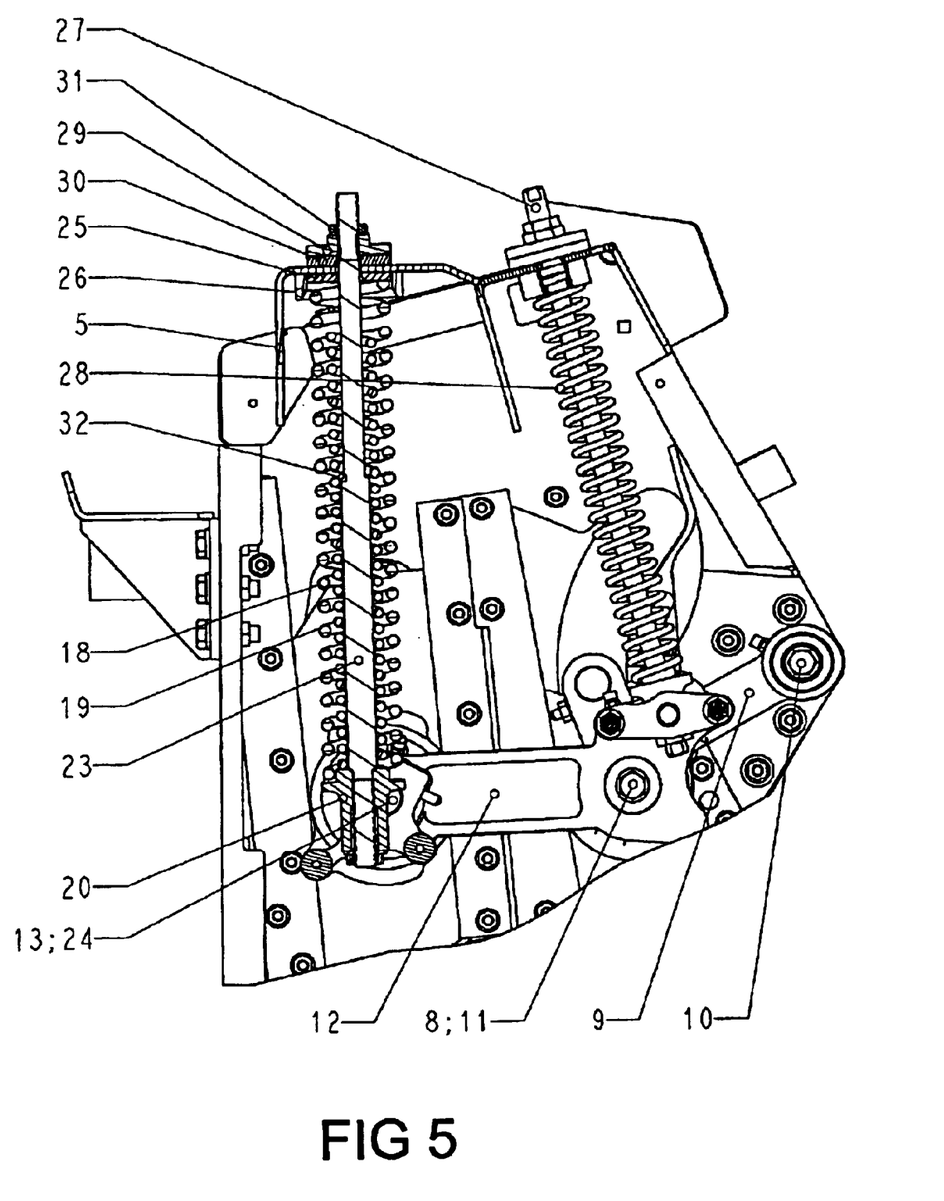
FIG. 5 shows a sectional view through the compression springs on the prepressing roller in its lowest position.
Figure 6:
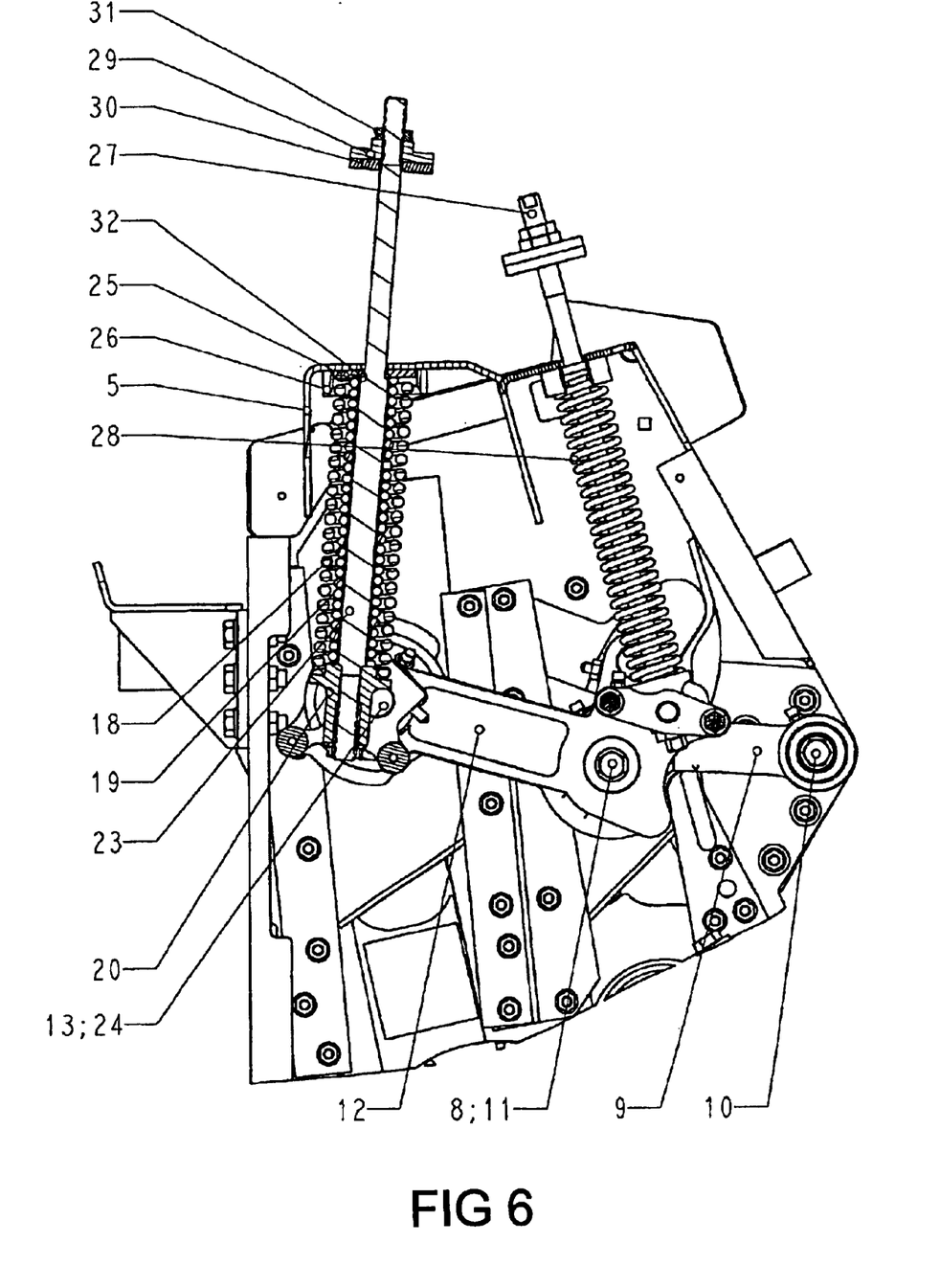
FIG. 6 shows a sectional view through the compression springs on the prepressing roller in its uppermost position.

The lengths of the external springs and of the internal springs are so chosen that the external spring in the lowest position of the prepressing roller (3) already abuts with its upper end on the upper edge of the casing (5) of the feeder device (1), whereas the upper end of the internal spring until then has still some free space. In order to explain the upper abutment refer to FIGS. 5 and 6. Here can be seen that first the external spring in FIG. 5 and later also the internal spring as in FIG. 6 abuts from below on a centering disc (25), which is welded onto the upper edge of the casing (5) and is surrounded by a sleeve (26) open below. The centering disc (25) has a central drilled hole, into which the upper end of the guide rod (23) is slid.

The spring system applying the rolling force to the pressing roller (4) is in principle constructed the same as that for the prepressing roller (3), only with the difference that around the guide rod (27) there is only one single compression spring (28) analogous to the compression spring (18) functioning as an external spring for the prepressing roller (3), the rolling force of which in comparison with the spring package on the prepressing roller (3) amounts to only 15 to 35 percent.

The lower stops for the position of the prepressing roller (3) and of the pressing roller (4) in their lowest position are formed from stop plates (29) fixed to the guide rods (23; 27), which fit closely with the interposition of rubber buffers (30) from above on the upper edge of the casing (5) of the feeder device (1). Their position can be adjusted by changing the lower positions of the upper feeder rollers by means of lock nuts (31).

The stop shoulders (32) fixed to the guide rods (23; 27) serve as upper stops for limiting the lift path of the prepressing roller (3) and of the pressing roller (4) in their uppermost position and fit closely from below on the centering disc (25) under the upper edge of the casing (5) of the feeder device (1).

The development of the compression spring as an external spring which is already under a certain prestress in the lowest position of the prepressing roller, it is ensured that the second compression spring sticking into it lies protected from dirt and that as a result it also requires no additional space.

The opposite direction of the coiling of the outer spring to that of the inner spring it is ensured that they cannot get hooked up in each other in any position.

The placing of the lower support of the outer spring and the inner spring as close as possible to the central axis of the shaft of the prepressing roller, in that through it the common roll force presses directly and exclusively on the prepressing roller. Through the shorter inner spring it is in addition to be noted, that with smaller layer thicknesses also only a small roll force is exerted only by the outer spring on the crop, which is completely sufficient and as a result the crop is not damaged in any way. With higher layer thicknesses on the other hand, then very high common roll forces are available, which are urgently needed in this region of the lifting path.

The lower stops for limiting the position of the prepressing roller and of the pressing roller are located in their lower positions above the upper edge the casing of the feeder device, as a result of which both rollers hang on their guide rods and the lower stops themselves lie in a relatively dirt-free space. Rubber buffers cushion any possible impacts from a rapid upward motion of the upper feeder rollers.

The invention has proved itself to implement the upper stops for limiting the position of the prepressing roller and the pressing roller in their uppermost positions through the guide rods themselves, in that each one is equipped with stop collar, which bears from below upon centering discs beneath the upper edge of the casing of the feeder device.

It is seen in that for a pressing roller with its bearing point points in oscillating cranks and on it connecting rods connected forwards for the bearings of the prepressing roller a facility is installed, which restricts somewhat the freely movable angular area between the oscillating crank and the connecting rod for the avoidance of blockages. In this way it is ensured that the pressing roller cannot remain in its lowest position, if the prepressing roller is in its uppermost position and vice versa. For this a short-formed part is attached which engages in a longer recess in the connecting rod, which forms an upper and a lower stop.

It will be obvious to those skilled in the art that various changes may be made without departing from the scope of the invention and the invention is not to be considered limited to what is illustrated in the drawings and described in the specification.

What is claimed is:

1. A spring system for the upper feeder rollers in forage harvesters, in particular in a feeder device on a self-propelled forage harvester, with at least one prepressing roller and a pressing roller, which are fixed opposite two lower feeder rollers which are arranged at fixed positions in a casing of the feeder device so that a distance can be varied, where the prepressing roller and the pressing roller with a set of compression springs, the upper ends of which abut with the casing of the feeder device and a lower end of the compression springs abut on the bearing points for the prepressing roller and the pressing roller are pressed in the direction of the lower feeder rollers, on which the compression springs are arranged concentrically around the guide rods, which with their lower ends are joined to the bearing points of the prepressing roller and of the pressing roller and are fixed with their upper ends to the casing of the feeder device so that the can slide freely, comprising:
   a. at each bearing point of the prepressing roller in its lowest position the compression spring, which is already under a slight prestress, touches and only from a somewhat raised position of the prepressing roller a second compression spring is arranged for producing a common roll force; and
   b. at each bearing point of the pressing roller only one compression spring touches, which in its lowest position is likewise under a slight prestress and its roll force is distinctly lower than the common roll force exerted upon the bearing points of the prepressing roller.

2. The spring system according to claim 1, wherein the compression spring which touches on each bearing point of the prepressing roller in its lowest position and is already under a small prestress is formed as an external spring, into which the second compression spring formed as an internal spring is inserted for producing the common roll force, in which both compression springs are arranged concentrically around a guide rod.

3. The spring system according to claim 2, wherein the external spring has a direction of coiling opposite to that of the internal spring.

4. The spring system according to claim 3, wherein the lower ends of the external spring and of the internal spring abut mutually on a spring base on the bearing point of the prepressing roller close to the central axis of its shaft and where in the lowest position of the prepressing roller the external spring with its upper end already abuts on the upper edge of the casing of the feeder device and the upper end of the internal spring exhibits a space up to an upper edge of the casing which serves also as an abutment for it.

5. The spring system according to claim 4, wherein the lower stops for limiting the position of the prepressing roller and of the pressing roller in their lowest position are formed from a set of stop plates attached to the guide rods, which with interposition of a set of rubber buffers fit closely from above on the upper edge of the casing of the feeder device.

6. The spring system according to claim 4, wherein the upper stops for limiting the position of the prepressing roller and of the pressing roller in their uppermost position are formed from a stop shoulder on the guide rods, which fit closely from below on the centering discs under the upper edge of the casing of the feeder device.

7. The spring system according to claim 6, wherein the pressing roller with its bearing points is held in the front end of the oscillating crank, which with its rear ends carried on pivot bolts attached on the casing of the feeder device so that it can pivot, and that on both sides of the shaft of the pressing roller a connecting rod is supported by its rear end, in the front ends of which are the bearing points for the prepressing roller, in which the connecting rod is free to move relative to the oscillating crank only within a limited angular range, in which a short formed part on the oscillating crank engages in a longer recess in the connecting rod.

* * * * *